(12) United States Patent
Martinez et al.

(10) Patent No.: US 8,279,868 B2
(45) Date of Patent: Oct. 2, 2012

(54) SYSTEM PROVIDING LAND MOBILE RADIO CONTENT USING A CELLULAR DATA NETWORK

(75) Inventors: Dennis Michael Martinez, Westford, MA (US); John Vaughan, Pepperell, MA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 847 days.

(21) Appl. No.: 11/130,975

(22) Filed: May 17, 2005

(65) Prior Publication Data

US 2006/0262771 A1    Nov. 23, 2006

(51) Int. Cl.
  *H04L 12/28* (2006.01)
  *H04L 12/56* (2006.01)
  *H04J 3/16* (2006.01)
  *H04J 3/22* (2006.01)
  *H04B 1/38* (2006.01)
  *H04M 1/00* (2006.01)

(52) U.S. Cl. ....... 370/392; 370/401; 370/466; 455/90.2; 455/552.1; 455/553.1

(58) Field of Classification Search .................. 370/338, 370/395.52, 466, 392, 230, 352, 401, 467, 370/389, 310, 349, 469; 445/575.9, 90.2, 445/90.1, 553.1, 550.1, 521, 426.1, 458, 445/454, 456.1, 552.1
See application file for complete search history.

(56) References Cited

U.S. PATENT DOCUMENTS

| | | | |
|---|---|---|---|
| 4,845,504 A | 7/1989 | Roberts et al. | |
| 4,852,086 A | 7/1989 | Eastmond et al. | |
| 4,955,083 A | 9/1990 | Phillips et al. | |
| 5,265,264 A | 11/1993 | Dzung et al. | |
| 5,479,480 A | 12/1995 | Scott | |
| 5,790,527 A | 8/1998 | Janky et al. | |
| 5,805,645 A | 9/1998 | Przelomiec et al. | |
| 5,862,486 A | 1/1999 | Przelomiec | |
| 5,870,149 A | 2/1999 | Comroe et al. | |
| 5,915,212 A | 6/1999 | Przelomiec et al. | |
| 5,930,723 A | 7/1999 | Heiskari et al. | |
| 5,995,515 A | 11/1999 | Suzuki | |
| 6,002,941 A | 12/1999 | Ablay et al. | |
| 6,009,553 A | 12/1999 | Martinez et al. | |
| 6,023,626 A | 2/2000 | Kinnunen et al. | |
| 6,035,196 A | 3/2000 | Hengeveld et al. | |
| 6,041,048 A | 3/2000 | Erickson et al. | |
| 6,084,919 A | 7/2000 | Kleider et al. | |
| 6,144,647 A | 11/2000 | Lopez-Torres | |
| 6,163,710 A | 12/2000 | Blaser et al. | |
| 6,215,778 B1 | 4/2001 | Lomp et al. | |

(Continued)

FOREIGN PATENT DOCUMENTS

EP    0 848 565 A2    6/1998

(Continued)

OTHER PUBLICATIONS

Software-Enabled Wireless Interoperability Assessment Report—Voice-over-IP Technology, Dec. 2001, www.safecomprogram.gov/NR/rdonlyres/65398E2E-C4EE-4779-BB91-600847499056/0/voip_technology_assessment.pdf.*

(Continued)

*Primary Examiner* — Ayaz Sheikh
*Assistant Examiner* — Hoang-Chuong Vu
(74) *Attorney, Agent, or Firm* — Fox Rothschild, LLP; Robert J. Sacco (57) ABSTRACT

A system and method for providing land mobile radio (LMR) content using a cellular data network is provided. The method includes communicating the LMR content via at least one of an LMR network and a cellular data network. The method further includes encapsulating the LMR content using a packet switching protocol when communicating the LMR content via the cellular data network.

14 Claims, 7 Drawing Sheets

U.S. PATENT DOCUMENTS

| | | |
|---|---|---|
| 6,253,082 B1 | 6/2001 | Hengeveld |
| 6,301,263 B1 | 10/2001 | Maggenti |
| 6,351,653 B1* | 2/2002 | Alberth et al. ............ 455/552.1 |
| 6,373,828 B1 | 4/2002 | Stewart et al. |
| 6,373,946 B1 | 4/2002 | Johnston |
| 6,449,491 B1 | 9/2002 | Dailey |
| 6,477,150 B1 | 11/2002 | Maggenti et al. |
| 6,515,997 B1* | 2/2003 | Feltner et al. ................ 370/401 |
| 6,549,587 B1 | 4/2003 | Li |
| 6,591,084 B1 | 7/2003 | Chuprun et al. |
| 6,611,536 B1 | 8/2003 | Ahmed |
| 6,683,881 B1 | 1/2004 | Mijares et al. |
| 6,757,266 B1 | 6/2004 | Hundscheidt |
| 6,775,337 B2 | 8/2004 | Janky et al. |
| 6,788,946 B2 | 9/2004 | Winchell et al. |
| 6,826,414 B1 | 11/2004 | Reynolds et al. ............. 455/555 |
| 6,831,903 B2 | 12/2004 | Kang |
| 6,865,372 B2 | 3/2005 | Mauney et al. |
| 6,912,387 B2 | 6/2005 | Haas et al. |
| 6,928,067 B1 | 8/2005 | Hameleers et al. |
| 6,928,294 B2 | 8/2005 | Maggenti et al. |
| 6,937,589 B2 | 8/2005 | Taketsugu |
| 7,031,286 B1 | 4/2006 | Hall et al. |
| 7,050,786 B2 | 5/2006 | Caci |
| 7,050,787 B2 | 5/2006 | Caci |
| 7,061,894 B2 | 6/2006 | Pang et al. |
| 7,065,058 B1 | 6/2006 | Korus |
| 7,079,857 B2* | 7/2006 | Maggenti et al. ............. 370/447 |
| 7,130,282 B2 | 10/2006 | Black |
| 7,149,552 B2 | 12/2006 | Lair |
| 7,218,630 B1 | 5/2007 | Rahman |
| 7,221,660 B1* | 5/2007 | Simonson et al. ............. 370/312 |
| 7,239,867 B2 | 7/2007 | Kotzin et al. |
| 7,245,927 B2* | 7/2007 | Hansen .......................... 455/461 |
| 7,250,830 B2 | 7/2007 | Layne et al. |
| 7,305,240 B2 | 12/2007 | Chou et al. |
| 7,307,963 B2 | 12/2007 | Chow et al. |
| 7,333,829 B2 | 2/2008 | Malone et al. |
| 7,443,965 B2 | 10/2008 | Blossom et al. |
| 7,460,510 B2* | 12/2008 | Olivier et al. ................. 370/338 |
| 7,483,416 B2 | 1/2009 | Olivier et al. |
| 7,489,698 B2 | 2/2009 | Blossom et al. |
| 7,492,734 B2 | 2/2009 | Mathis et al. |
| 7,492,737 B1* | 2/2009 | Fong et al. .................... 370/331 |
| 7,864,725 B2 | 1/2011 | Li et al. |
| 2001/0046214 A1 | 11/2001 | Kang |
| 2002/0086665 A1 | 7/2002 | Maggenti et al. |
| 2002/0086701 A1* | 7/2002 | Salmi et al. .................... 455/552 |
| 2002/0093928 A1 | 7/2002 | LoGalbo et al. |
| 2002/0101859 A1 | 8/2002 | Maclean |
| 2002/0115475 A1* | 8/2002 | Abrol et al. .................... 455/564 |
| 2002/0151321 A1 | 10/2002 | Winchell et al. |
| 2002/0161841 A1* | 10/2002 | Kinnunen ..................... 709/206 |
| 2002/0196781 A1* | 12/2002 | Salovuori ...................... 370/352 |
| 2003/0012217 A1 | 1/2003 | Andersson et al. |
| 2003/0053434 A1 | 3/2003 | Chow et al. |
| 2003/0058827 A1 | 3/2003 | Chow et al. |
| 2003/0119498 A1 | 6/2003 | Haas et al. |
| 2003/0134638 A1 | 7/2003 | Sundar et al. |
| 2003/0148785 A1* | 8/2003 | Mangal et al. ................. 455/552 |
| 2003/0156578 A1 | 8/2003 | Bergenlid et al. |
| 2003/0169768 A1 | 9/2003 | Bienn et al. |
| 2003/0177245 A1* | 9/2003 | Hansen ......................... 709/228 |
| 2003/0189950 A1* | 10/2003 | Spear et al. ................... 370/466 |
| 2003/0190932 A1* | 10/2003 | Pulkkinen et al. ............ 455/561 |
| 2003/0198198 A1 | 10/2003 | Echavarri et al. |
| 2004/0032843 A1* | 2/2004 | Schaefer et al. .............. 370/338 |
| 2004/0121729 A1 | 6/2004 | Herndon et al. |
| 2004/0121781 A1* | 6/2004 | Sammarco ................. 455/456.1 |
| 2004/0190468 A1* | 9/2004 | Saijonmaa .................... 370/312 |
| 2004/0196861 A1 | 10/2004 | Rinchiuso et al. |
| 2004/0202940 A1* | 10/2004 | Kramer et al. ................ 429/306 |
| 2004/0203938 A1 | 10/2004 | Kulkarni |
| 2005/0058136 A1 | 3/2005 | Lothberg et al. |
| 2005/0070280 A1* | 3/2005 | Jung et al. ..................... 455/434 |
| 2005/0073964 A1* | 4/2005 | Schmidt et al. ............... 370/260 |
| 2005/0078627 A1* | 4/2005 | Yoon et al. .................... 370/328 |
| 2005/0135348 A1 | 6/2005 | Staack |
| 2005/0143056 A1* | 6/2005 | Iyer et al. ...................... 455/416 |
| 2005/0157673 A1 | 7/2005 | Verma et al. |
| 2005/0159107 A1 | 7/2005 | Mauney et al. |
| 2005/0176473 A1 | 8/2005 | Melpignano |
| 2005/0180418 A1 | 8/2005 | Andersen et al. |
| 2005/0197101 A1* | 9/2005 | Gupta ........................... 455/410 |
| 2005/0232241 A1* | 10/2005 | Wu et al. ....................... 370/352 |
| 2005/0233776 A1* | 10/2005 | Allen et al. .................... 455/567 |
| 2005/0243785 A1 | 11/2005 | Sabat et al. |
| 2005/0243857 A1 | 11/2005 | Hofstaedter et al. |
| 2006/0002372 A1 | 1/2006 | Smith |
| 2006/0013191 A1 | 1/2006 | Kavanagh |
| 2006/0035669 A1 | 2/2006 | Chuprun et al. |
| 2006/0077924 A1 | 4/2006 | Rune |
| 2006/0084457 A1 | 4/2006 | Laha et al. |
| 2006/0089180 A1* | 4/2006 | Salmi ......................... 455/575.1 |
| 2006/0092865 A1* | 5/2006 | Williams ...................... 370/310 |
| 2006/0104293 A1 | 5/2006 | Kopp et al. |
| 2006/0114890 A1 | 6/2006 | Boys |
| 2006/0126635 A1* | 6/2006 | Alberth et al. ............. 370/395.2 |
| 2006/0141939 A1 | 6/2006 | Nakada |
| 2006/0145781 A1 | 7/2006 | Layne et al. |
| 2006/0147008 A1* | 7/2006 | Blossom et al. ......... 379/202.01 |
| 2006/0171307 A1 | 8/2006 | Gopalakrishnan et al. |
| 2006/0193295 A1 | 8/2006 | White et al. |
| 2006/0205398 A1 | 9/2006 | Seckendorf et al. |
| 2006/0209828 A1 | 9/2006 | Ng et al. |
| 2006/0221968 A1* | 10/2006 | Razdan et al. ................ 370/392 |
| 2006/0234762 A1 | 10/2006 | Ozluturk |
| 2006/0245425 A1* | 11/2006 | Mathis et al. ................. 370/389 |
| 2006/0262800 A1 | 11/2006 | Martinez et al. |
| 2006/0280144 A1 | 12/2006 | Kangas |
| 2006/0281471 A1 | 12/2006 | Shaffer et al. |
| 2007/0049314 A1 | 3/2007 | Balachandran et al. |
| 2007/0072554 A1 | 3/2007 | Janky |
| 2007/0081637 A1 | 4/2007 | Beard et al. |
| 2007/0153789 A1 | 7/2007 | Barker et al. |
| 2007/0173222 A1* | 7/2007 | Hansen ......................... 455/403 |
| 2007/0201432 A1 | 8/2007 | Sood et al. |
| 2007/0207731 A1 | 9/2007 | Hansen |
| 2007/0242670 A1* | 10/2007 | Simonson et al. ............ 370/390 |
| 2007/0291744 A1 | 12/2007 | Lundberg et al. |
| 2008/0031207 A1 | 2/2008 | Martinez et al. |
| 2008/0031275 A1 | 2/2008 | Janky et al. |
| 2008/0075055 A1 | 3/2008 | Chow et al. |
| 2008/0146221 A1 | 6/2008 | Noldus |
| 2008/0159128 A1 | 7/2008 | Shaffer et al. |
| 2008/0175263 A1 | 7/2008 | Chen et al. |
| 2008/0205321 A1 | 8/2008 | Martinez |
| 2008/0214232 A1 | 9/2008 | Ozluturk |
| 2008/0218427 A1 | 9/2008 | Dobosz et al. |
| 2008/0298293 A1 | 12/2008 | Hiben et al. |
| 2008/0299942 A1 | 12/2008 | Goulder et al. |
| 2008/0317066 A1 | 12/2008 | Trine et al. |
| 2009/0005100 A1 | 1/2009 | Copeland |
| 2009/0024845 A1 | 1/2009 | Benshetler et al. |
| 2009/0215411 A1* | 8/2009 | Tucker et al. ................ 455/90.2 |

FOREIGN PATENT DOCUMENTS

| | | |
|---|---|---|
| EP | 848565 A2 * | 6/1998 |
| EP | 0 940 924 A2 | 9/1999 |
| EP | 1612996 A1 | 1/2006 |
| JP | 62078925 A | 4/1987 |
| KR | 1020020025170 A | 4/2002 |
| WO | WO 97/36445 | 10/1997 |
| WO | 98 57482 A1 | 12/1998 |
| WO | 01 52563 A2 | 7/2001 |
| WO | WO 01/52563 A2 | 7/2001 |
| WO | WO 02/28131 A1 | 4/2002 |
| WO | WO 02/084913 A1 | 10/2002 |
| WO | WO 03/015431 A1 | 2/2003 |

OTHER PUBLICATIONS

"The Authoritative Dictionary of IEEE Standards Terms", Standards Information Network IEEE press, Seventh Edition, p. 378.*

Ericsson: "Communication and information services for national security and public safety", White Paper, [Online], Apr. 2005, pp. 1-25, XP002397357.

Boukalov A: "Cross standard system for future public safety and emergency communications" Vehicular Technology Conference, 2004. VTC2004—Fall. 2004 IEEE 60th Los Angeles, CA, USA Sep. 26-29, 2004, Piscataway, NJ, USA, IEEE, Sep. 26, 2004, pp. 5224-5229, XP010790402.

Tattersall P R"Professional Mobile Radio—The BT Airwave Public Safety Service and the Path for Technology and Service Evolution" BT Technology Journal, Springer, Dordrecht, NL, vol. 19, No. 1, Jan. 1, 2001, pp. 142-148, XP001006588.

Registration No. H1641; Sharman; "Connection of Mobile Devices to Heterogenous Networks"; Published Apr. 1, 1997; 16 pages.

Final Office Action, mailed Dec. 2, 2008, U.S. Appl. No. 11/167,005, filed Jun. 24, 2005, (12) pages.

Non-Final Office Action, mailed Jun. 23, 2009, U.S. Appl. No. 11/167,005, filed Jun. 24, 2005, (11) pages.

Ericsson, "Communication and Information Services for National Security and Public Safety", White Paper, Apr. 2005, pp. 1-25 [online] URL:222.ericsson.com/technolooy/whitepapers/2952_nsps_a.pdf.

Boukalov, "Cross Standard System for Future Public Safety and Emergency Communications". Vehicular Technology Conference, 2004. VTC2004-Fall. 2004 IEEE 60th Los Angeles, CA, USA Sep. 26-29, 2004, Piscataway, NJ, USA, IEEE, Sep. 26, 2004, pp. 5224-5229.

Tattersall, "Professional Mobile Radio—The BT Airwave Public Safety Service and the Path for Technology and Service Evolution" BT Technology Journal, Springer, Dordrecht, NL, vol. 19, No. 1, Jan. 1, 2001, pp. 142-148.

Information about Related Patents and Patent Applications, see section 6 of the accompanying Information Disclosure Statement Letter, which concerns Related Patents and Patent Applications.

M/A Com, Inc., VIDA Network Solutions—The IP Network Approach to Your Critical Communications, [online], May 18, 2004, pp. 1-8, XP-002619659, [retrieved on Feb. 1, 2011]. Retrieved from the Internet: < URL:http://www.racom.net/Downloads/VIDA_Brochure.pdf>.

Extended European Search Report mailed Mar. 3, 2011, European Application No. 10015389.9-1249, in the name of Pine Valley Investments, Inc.

European Search Report mailed Feb. 24, 2011, Application Serial No. 10015388.1.

Whitepaper, Mobitv, "ATSC-M/H: The Promise of Free to Air Mobile Simulcast" found at <<http://www.mobitv.conn/technology/whitepapers/ATSC.PDF>> on Mar. 13, 2009.

"The Authoritative Dictionary of IEEE Standard Terms", Standards Information Network IEEE Press, Seventh Edition, p. 378.

Ericsson: "Communication and Information Services for National Security and Public Safety", White Paper, [online] Apr. 2005, pp. 1-25, XP002397357.

* cited by examiner

SYSTEM PROVIDING LAND MOBILE RADIO CONTENT USING A CELLULAR DATA NETWORK

BACKGROUND OF THE INVENTION

This invention relates generally to land mobile radios, and more particularly, to a system for providing land mobile radio content using a cellular data network.

Land mobile radios may be used to provide communication between different mobile units, for example, land mobile radios. Land mobile radio band communication, for example, public safety radio communication (e.g., police, fire department, etc.) is generally available within the VHF, UHF, 700 MHz and 800 MHz frequency bands. Part of each of these frequency bands is allocated by the Federal Communications Commission (FCC) for public safety communication services and are also referred to as Public Safety Frequency Bands. These communications also may be provided using private land mobile radio services (PLMRS).

Cellular networks also provide communication between different mobile users, for example, cellular telephones. These cellular networks continue to be enhanced and allow for a continually growing set of applications to be made available to users. For example, these cellular networks now provide Push-to-talk (PTT) services that provide direct connect capabilities. Thus, a cellular phone user may request a direct connect communication link with another cellular phone user in a two way radio or "walkie talkie" type communication. As another example, these cellular networks provide high-speed data services, such as, for example, General Packet Radio Service (GPRS), Enhanced Data Rates for GSM Evolution (EDGE), Evolution Data Optimized (EV-DO) and Universal Mobile Telephone Service (UMTS).

Known systems providing enhanced services or features, such as enhanced calling or voice features, which may be used, for example, for mission critical wireless networks, such as public safety applications, use commercial cellular services, such as PTT services, to augment and or replace traditional LMR systems. These systems are provided using specialized gateway equipment that enables certain interoperability capabilities between an LMR system and a cellular network with PTT capabilities by translating and/or transforming the data or voice communications to be communicated between the networks, for example from an LMR network to a cellular network.

In the Land Mobile Radio (LMR) industry, new technologies are also being provided, including the use of digital communication instead of analog communication. Additionally, LMR systems are now using packet switching instead or circuit switching, for example, using Internet Protocol (IP) and Voice Over IP (VoIP) to enable construction of highly scalable and cost effective LMR networks.

Traditionally, LMR networks have been used to provide mission critical applications such as public safety communications. In addition to providing a very high level of system availability, LMR networks are primarily designed to support PTT services, such as a dispatch mode of operation. In LMR networks, PTT services are often configured for operation in connection with defined or predetermined workgroups. For communication purposes, workgroups further may be organized into talk groups. In operation, radio users and dispatchers key up PTT on a talk group. The LMR network is configured such that all members of the workgroup receive the communications being broadcast on a particular talk group.

In addition to PTT services, LMR networks also may contain a feature set to support a variety of mission critical applications. For example, in public safety applications, LMR networks provide a number of emergency services, for example, to allow a user in trouble to invoke an emergency alerting capability with a single button press. LMR Networks also provide a variety of priority and preemption services. These services provide system access to the most important communications when there are insufficient resources or inadequate system capacity to handle all the concurrent PTT calls.

These LMR systems use specialized LMR airlink protocols to communicate wirelessly between LMR radios and LMR infrastructure. Known systems for providing LMR features or communications, such as PTT, over a public network, for example, a public cellular network, translate or transform the data or communications, for example, using VoIP protocols in the terminals/radio devices. Thus, these systems require additional controls and equipment to implement the interconnectivity, thereby adding complexity and cost to the overall system.

BRIEF DESCRIPTION OF THE INVENTION

In one exemplary embodiment, a method for communicating land mobile radio (LMR) content is provided. The method includes communicating the LMR content via at least one of an LMR network and a cellular data network. The method further includes encapsulating the LMR content using a packet switching protocol when communicating the LMR content via the cellular data network.

In another exemplary embodiment, a wireless communication system is provided that includes a packet switched land mobile radio (LMR) infrastructure configured to communicate with a plurality of LMR units via at least one of an LMR network and a cellular data network. The wireless communication system further includes an interface configured to process received LMR content encapsulated in a packet switching protocol.

In yet another exemplary embodiment, a digital signal included in a carrier wave is provided and includes a land mobile radio (LMR) data portion and a packet switching protocol encapsulation portion.

DETAILED DESCRIPTION OF THE INVENTION

Various embodiments of the present invention include a system for providing land mobile radio (LMR) content, for example, LMR services using cellular data networks. The LMR content retains an LMR application layer, but instead of using the LMR frequency bands with LMR transport protocols, the LMR content is communicated using cellular frequency bands over cellular packet switched data networks.

It should be noted that when reference is made herein to LMR content, this refers generally to any type or kind of LMR voice and/or data content, and may define particular LMR services, operations, controls, etc. For example, the LMR content may include, but is not limited to, voice data, emergency signal data, control data relating to selecting a particular talk group, LMR data for transfer between a radio unit and a server, reprogramming data (e.g., software upgrade data), etc.

Figure 1:
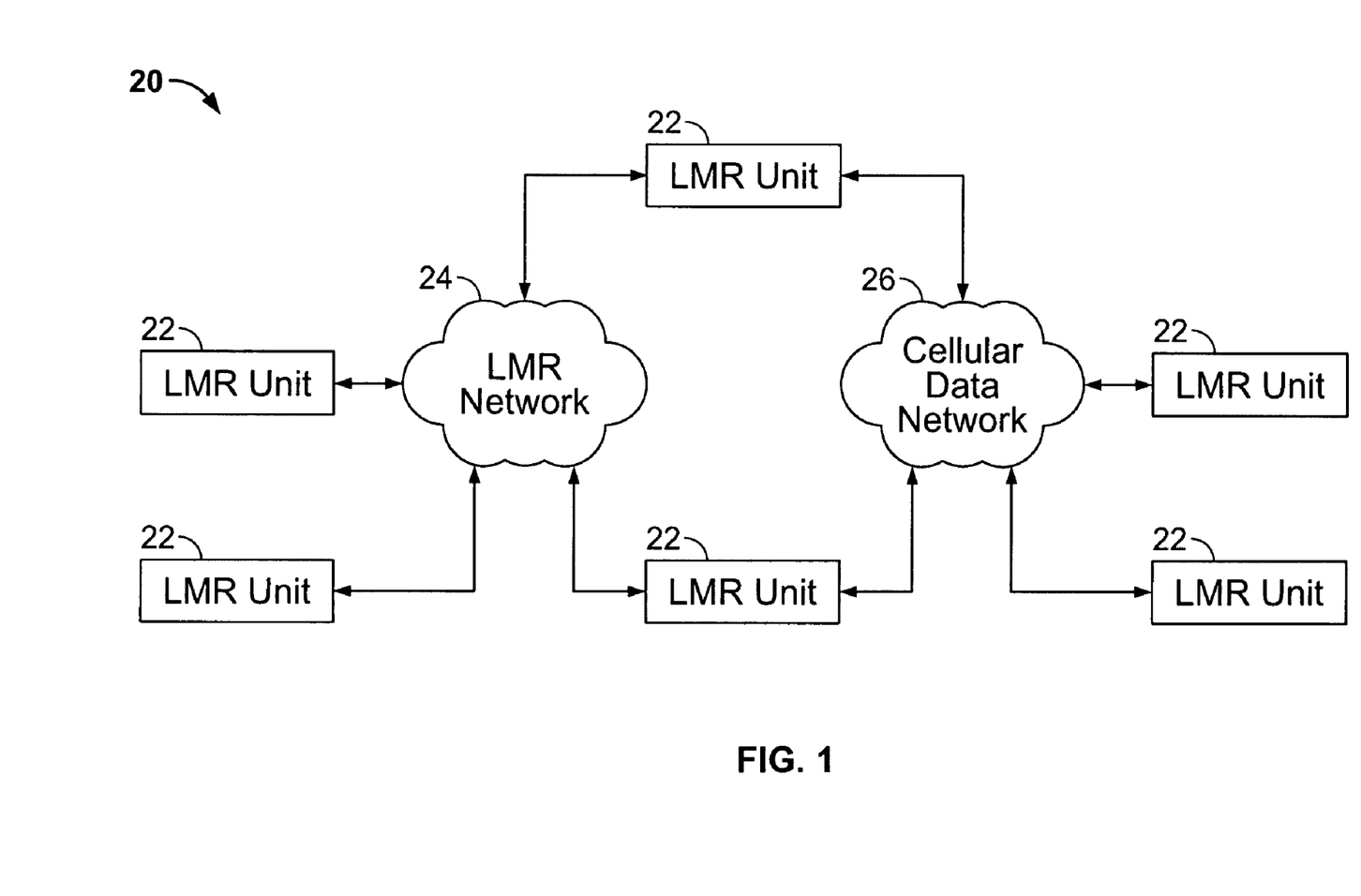
FIG. 1 is a block diagram of a Land Mobile Radio (LMR) communication system constructed in accordance with an exemplary embodiment of the present invention.

Specifically, as shown in FIG. 1, a wireless communication system, and more particularly, an LMR communication system 20 constructed according to various embodiments of the invention provides communication between a plurality of LMR units 22 or LMR terminals. Communication between the LMR units 22 is provided via either an LMR network 24 or a cellular data network 26. Each of the LMR units 22 is configured to provide communication, for example, with other LMR units 22 using one of the LMR network 24 and the cellular data network 26. In particular, each of the LMR units 22 is configured to switch between one of the LMR network 24 and the cellular data network 26, for example, based on the available network, available bandwidth, the coverage area, the communication signal strength, etc. Optionally, or in another embodiment, switching between one of the LMR network 24 and the cellular data network 26 is based on the type of communication or content. Thus, in addition to providing communication over the LMR network 24, wireless data services of the cellular data network 26 may be used to support the communication and/or transport of LMR application layer protocols.

Various embodiments enable end-to-end LMR services to be overlaid on top of the cellular data network 26, thereby allowing, for example, implementation of mission critical LMR systems within the service area of these cellular data networks 26. In order to provide this functionality and communication of LMR content using the cellular data network 26, each of the LMR units 22, for example, LMR radios, is provided with a cellular radio-modem device to allow operating end-to-end LMR application layer protocols and services between the LMR units 22 and the packet switched LMR infrastructure.

Figure 2:
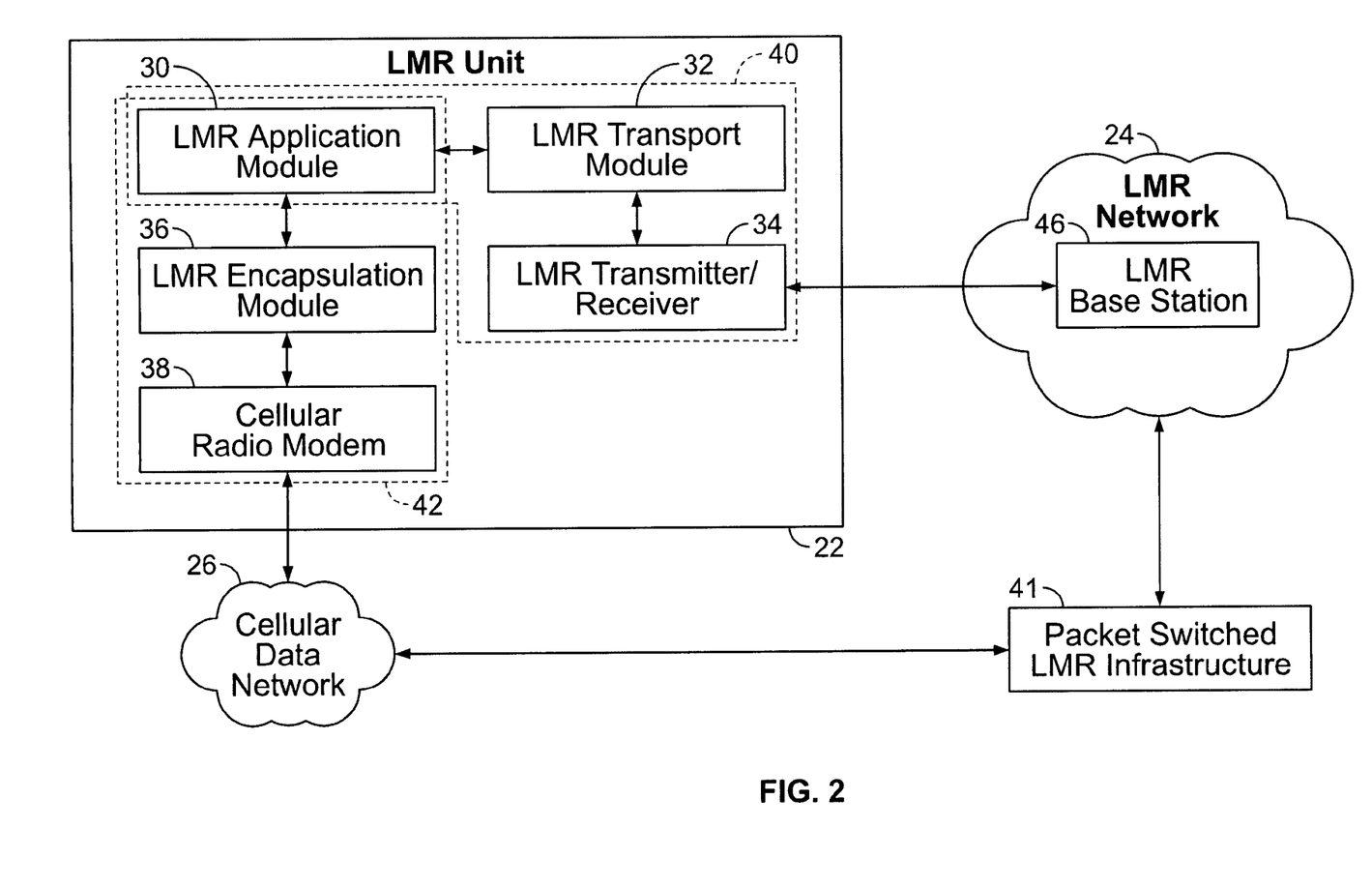
FIG. 2 is a block diagram of an LMR unit of the LMR communication system of FIG. 1 constructed in accordance with an exemplary embodiment of the present invention.

More particularly, and as shown in FIG. 2, the LMR unit 22 includes a plurality of modules or components configured to provide communication via the LMR network 24 or the cellular data network 26. Specifically, the LMR unit 22 includes an LMR application module 30 connected to an LMR transport module 32 for configuring voice and/or data for communication via the LMR network 24 (having one or more LMR base stations 46) using an LMR transmitter/receiver 34, which may be separate units or provided as a single transceiver. The LMR application module 30, LMR transport module 32 and LMR transmitter/receiver 34 generally define an LMR communication portion 40 of the LMR unit 22. The LMR unit 22 further includes an LMR encapsulation module 36 for encapsulating the voice and/or data for communication via the cellular data network 26 using a cellular radio modem 38. The LMR application module 30, LMR encapsulation module 36 and cellular radio modem 38 generally define a cellular data network communication portion 42 of the LMR unit 22.

The LMR unit 22 may include additional components, for example, an antenna (not shown) for use in transmitting and receiving signals as is known. Additionally, and for example, the LMR unit 22 may include filters (not shown), such as a receive filter and a transmit filter for filtering signals that are received and transmitted, respectively, by the LMR unit 22. The LMR unit 22 also may include, for example, a switch (not shown) or other controller for switching between the LMR communication portion 40 and the cellular data network communication portion 42.

In operation, the LMR system 20 may provide communication via the LMR network 24 using different known protocols, for example, LMR airlink protocols. For example, these LMR airlink protocols include the Project 25 (TIA 102) and ETSI TETRA standards, among others. These LMR airlink protocols specify the format and procedures for information exchange between the LMR unit 22 and the LMR network 24, and in particular, the LMR base station 46. It should be noted that when the base station(s) 46 are part of a larger system, the base station(s) 46 are interconnected to switching equipment (not shown) that routes voice and data between different parts of the system, such as to other LMR base stations or dispatch consoles.

As is known, the LMR base station 46 processes, for example, manipulates, the voice, data and control information received over the airlink into an alternate format suitable for communication within the LMR network 24, for example, for transport to switching equipment. For example, received discrete voice, data and control transmissions may be encapsulated in TCP/IP or UDP/IP packets as is known, with the resultant IP packets communicated between the LMR base station(s) 46 and the switching equipment over an IP network.

The LMR unit 22 also may provide communication via the cellular data network 26 using different known protocols, for example, General Packet Radio Service (GPRS), Enhanced Data Rates for GSM Evolution (EDGE), Evolution Data Optimized (EV-DO), Universal Mobile Telephone Service (UMTS), and 802.16 standards, among others. These cellular protocols specify the format and procedures for information exchange between the LMR unit 22, and in particular, the cellular radio modem 38, and the cellular data network 26.

For example, a cellular tower (not shown) having base station (not shown) may be provided for receiving and processing signals from the LMR unit 22, for example, manipulating the received voice, data and control information into an alternate format suitable for communication within the cellular data network 26, for example, for transport to a router and server (not shown) based on an IP address for the data packets received. For example, received encapsulated signals are decapsulated and appropriately routed within the cellular data network 26.

Figure 3:
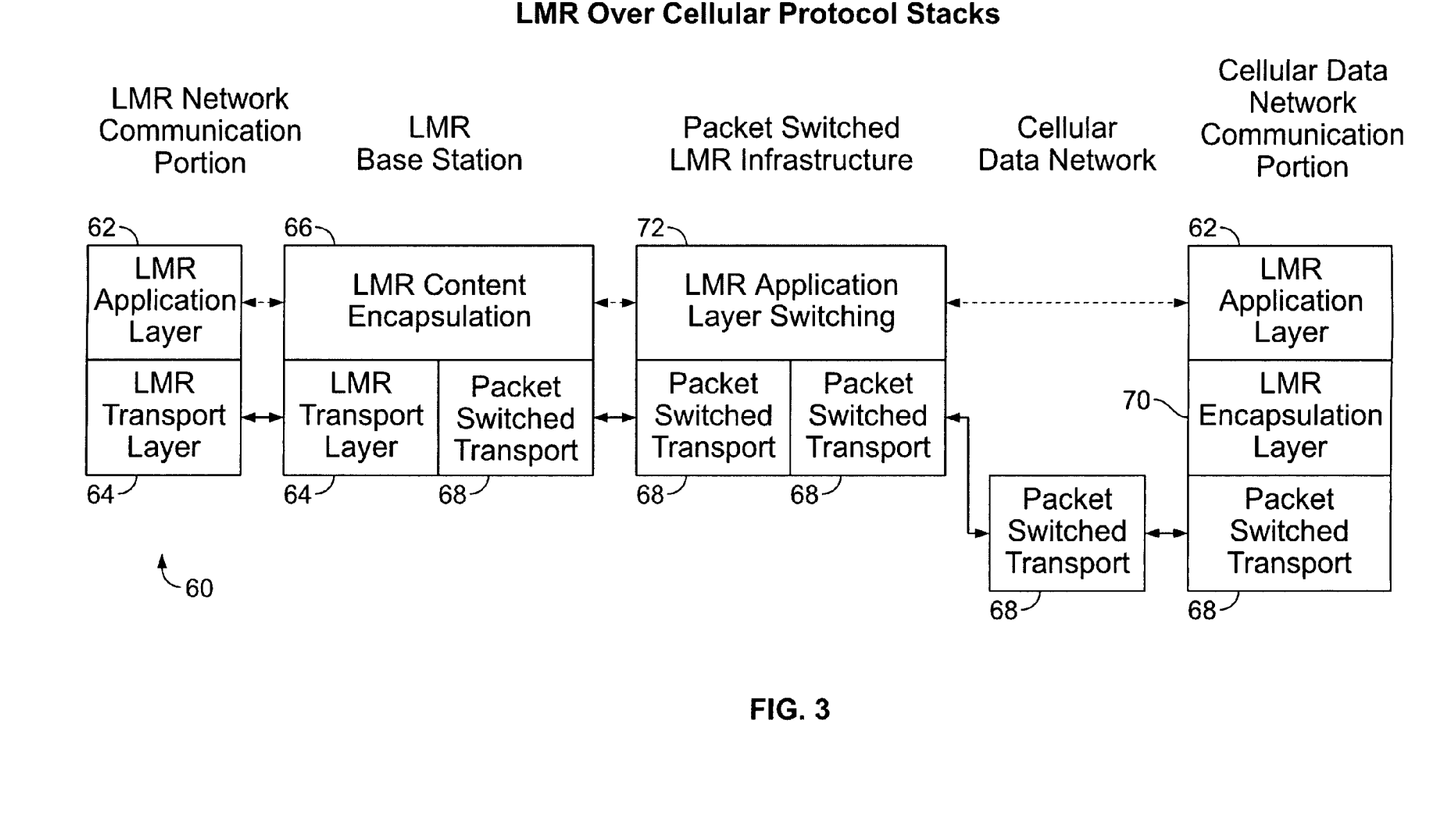
FIG. 3 is a block diagram illustrating protocol stacks in accordance with an exemplary embodiment of the present invention.

Thus, communication of data from either the LMR network 24 or the cellular data network 26 to a packet switched LMR infrastructure 41 is provided. It should be noted that the LMR content and LMR network may be configured based on different airlink protocols. In order to provide communication via either the LMR network 24 or the cellular data network 26 using the LMR unit 22, the communication protocol stacks for communication with each of these networks is partitioned as shown in FIG. 3. In particular, and with respect to communication with the LMR unit 22 using the LMR network 24, the LMR protocol stack 60 is partitioned into multiple layers, which in an exemplary embodiment, is a two-layer protocol stack having an LMR application layer 62 and an LMR transport layer 64. The application layer 62 and the LMR transport layer 64 may be provided, for example, by the LMR application module 30 and LMR transport module 32 (both shown in FIG. 2), respectively. The LMR application layer 62 is configured to provide interpretation and processing of the voice, data and control information and the LMR transport layer 64 is configured to provide delivery of the voice, data and control information over the transmission medium. As described herein, an LMR airlink protocol defines the both the LMR application layer 62 and the LMR transport layer 64.

In this two-layer protocol stack model, the LMR base station 46 (shown in FIG. 2) and switching equipment in the LMR network 24 (shown in FIG. 2) receive content from the LMR communication portion 40 (shown in FIG. 2) and communicate content of the LMR application layer 62 therebetween with a different transport layer. In particular, and as shown in FIG. 3, the content of the application layer 62 is encapsulated at the LMR base station 46 (shown in FIG. 2) using LMR content encapsulation 66 as is known. In an exemplary embodiment, discrete transmission units are encapsulated within transport datagrams, and in particular, packet switched transport datagrams 68, that are communicated using a transport protocol. Upon receipt of an encapsulated datagram, the application layer content then may be recovered, and in particular, decapsulated.

Further, this two-layer protocol stack model enables delivering LMR application layer services over non-LMR wireless networks using, for example, the cellular data network communication portion 42 (shown in FIG. 2). Specifically, the cellular data network communication portion 42 is configured to provide the LMR application layer 62, but instead of using the LMR transport Layer 64, the transport services of a wireless cellular data network 26 (shown in FIG. 2) are used. In particular, an LMR encapsulation layer 70 is used with the packet switched transport datagrams 68 such that the wireless cellular data network 26 communicates with switching equipment using suitable transport protocols, thereby delivering the identical LMR application layer services as the LMR communication portion 40. Specifically, the packet switched LMR infrastructure 41 (shown in FIG. 2) communicates the LMR application services using LMR application layer switching 72 in combination with packet switched transport datagrams 68.

It should be noted that the various embodiments are not limited to a two-layer protocol stack and additional layers may be provided to the multi-layer protocol stack as desired or needed. For example, different session layers, such as a bulk encryption layer may be provided. Further, and for example, an RTP layer may be provided.

Figure 4:
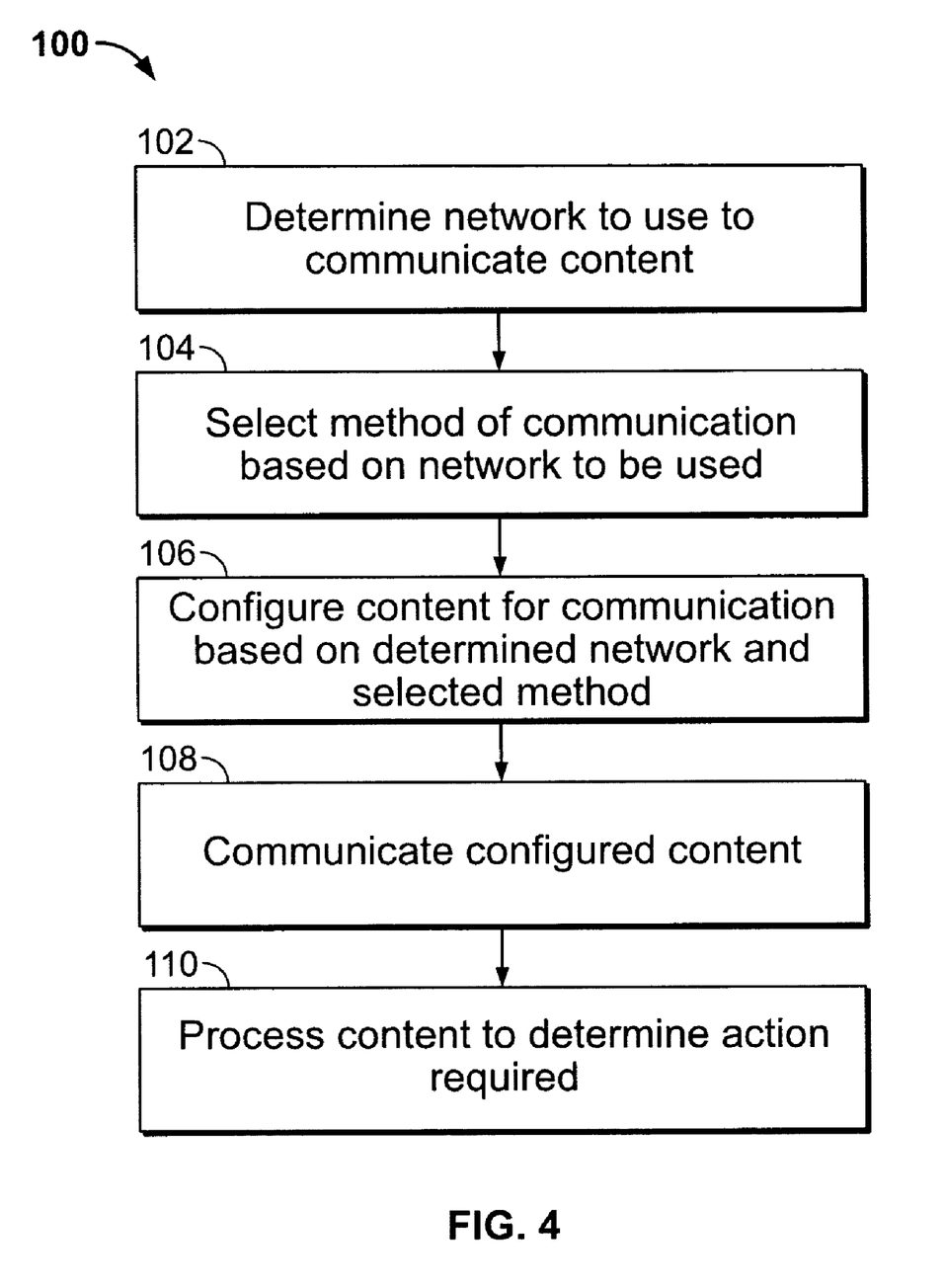
FIG. 4 is a flowchart of a method for controlling communication of LMR content in an LMR communication system in accordance with an exemplary embodiment of the present invention.

Various embodiments of the present invention provide for controlling communication of LMR content in an LMR communication system using an LMR network and a non-LMR wireless network, in particular, a wireless cellular data network. In particular, a method 100 of controlling communication of LMR content is shown in FIG. 4 and includes determining at 102 the network to use to communicate the LMR content. In an exemplary embodiment, a determination is made as to whether the LMR content is to be communicated using an LMR network or a cellular data network. The determination may be based on a manual selection, for example, based on a user input selection of which network to use. The selection may be made, for example, using a button or switch on the LMR unit 22 (shown in FIG. 2). Alternatively or optionally, the determination of which network to use may be automatic. For example, the selection of a network for communicating LMR content may be based on the amount of data traffic on a particular network or available bandwidth, a transmission priority level, the type of communication or content (e.g., voice or emergency broadcast signal, emergency communication or PTT request), the signal strength for the LMR unit, the geographic location of the LMR unit, a user preference, etc.

After a determination of the network to use to communicate the LMR content is made at 102, a method of communication is selected at 104 based on the determined network to use. For example, the speed or baud rate of the communication may be selected (manually or automatically) from a range of communication data rates. Additionally, the setup procedures for establishing and connecting to the determined network may be selected. For example, if the LMR network is to be used, an LMR network communication setup routine may be executed wherein a communication link is established between the LMR unit and the LMR network via an LMR transmitter/receiver within the LMR unit. If the cellular data network is to be used, a cellular data network communication setup routine may be executed wherein a communication link is established between the LMR unit and the cellular data network via a cellular radio modem of the LMR unit. The setup routine may include any suitable process as is known for establishing a wireless communication link.

Thereafter, at 106 the LMR content is configured for communication based on the determined network and selected method of communication. For example, if the LMR content is to be communicated using the LMR network, a selection of a particular LMR standard in which to configure or format the LMR content is selected. In particular, an LMR standard in which to configure the voice and/or data payload defining the LMR content is selected. This may include, for example, selecting one of a Project 25 (TIA 102) or an ETSI TETRA standard for the method of communication. Further, and for example, a proprietary format may be selected, for example, an OpenSky M/A-COM proprietary format, a NetworkFirst or EDACS system proprietary format.

Further and for example, if the LMR content is to be communicated using the cellular data network, a selection of a particular wireless cellular data network standard in which to configure or format the LMR content is selected. In particular, a wireless cellular standard in which to configure the voice and/or data payload defining the LMR content is selected. This may include, for example, selecting one of a General Packet Radio Service (GPRS), Enhanced Data Rates for GSM Evolution (EDGE), Evolution Data Optimized (EV-DO), Universal Mobile Telephone Service (UMTS) or 802.11 system standard.

Additionally, and as described in more detail above in connection with FIG. 3, depending on the network to be used to communicate the LMR content, a particular protocol stack may be used. Further, if the LMR content is to be communicated using the LMR network, an LMR protocol header is added to the LMR data payload. If the LMR content is to be communicated using the cellular data network, then a packet switch protocol header is added. As described in more detail below, if the LMR content is to be communicated using the cellular data network, then the LMR content is encapsulated, for example, Internet Protocol (IP) encapsulated with an IP wrapper prior to communicating to or from the cellular data network. The method for encapsulating the data is described in more detail below in connection with FIG. 5.

Referring again to FIG. 4, after the LMR content is configured at 106, the configured LMR content is communicated at 108. For example, if the LMR content is configured for communication using the LMR network, an LMR transmitter and receiver may be used to communicate the LMR content. If the LMR content is configured for communication using the cellular data network, a cellular radio modem may be used to communicate the LMR content. It should be noted that the cellular radio modem may be configured to operate in a single mode of operation or may be configured to operate in a multiple modes. In another embodiment, more than one cellular radio modem may be provide, each of which may be configured to operate in a single mode of operation or may be configured to operate in multiple modes of operation.

After the LMR content is communicated and received, for example, by a base station of the network, the LMR content is processed at 110 to determine an action. For example, this may include a determination to communicate voice data or to issue an emergency signal or PTT request to a talk group. For example, if the LMR content is communicated using the cellular data network, the IP destination address of an encapsulated datagram may first be determined and then communicated to that location for processing using a router in the network.

Figure 5:
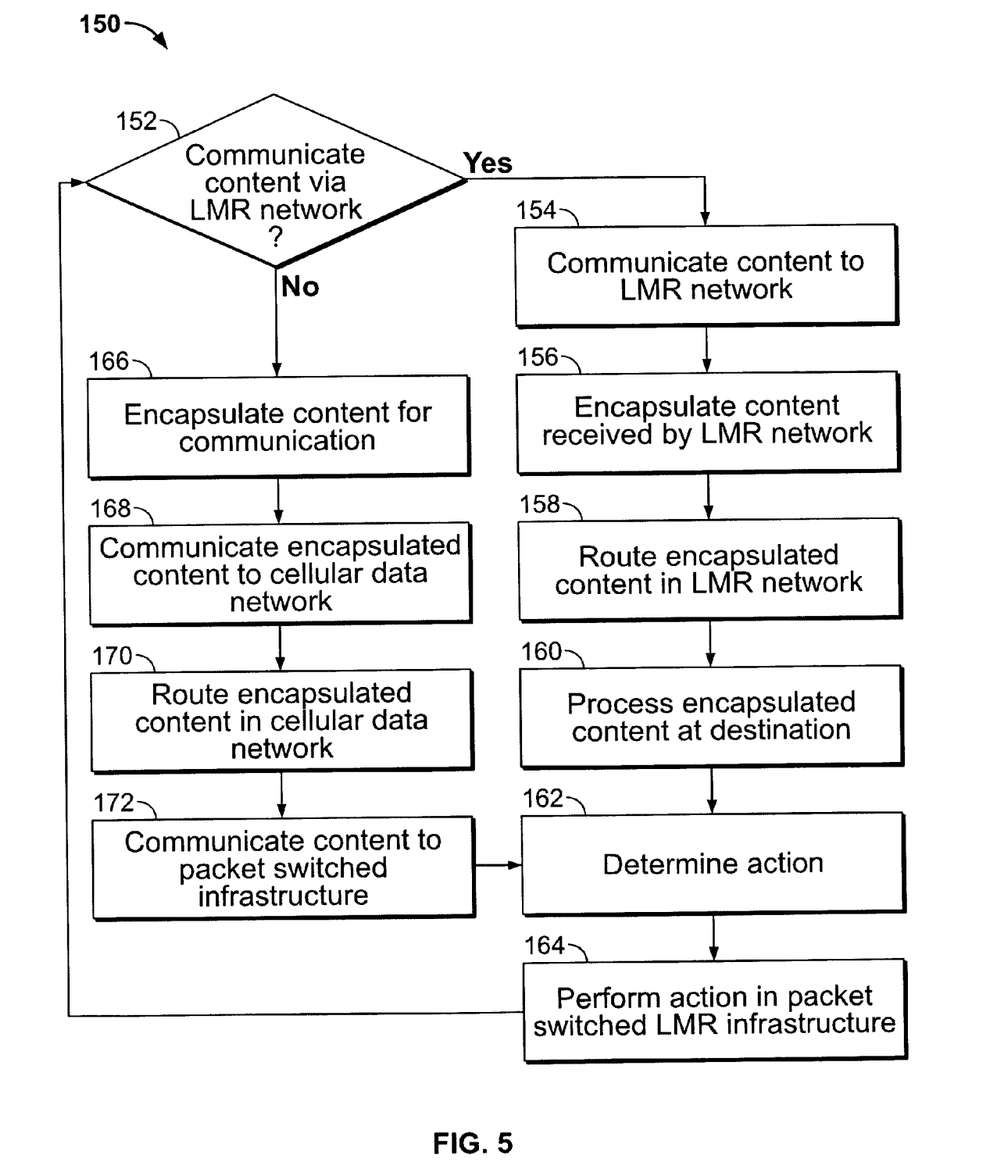
FIG. 5 is a flowchart of a method for processing LMR content in accordance with an exemplary embodiment of the present invention.
Figure 6:
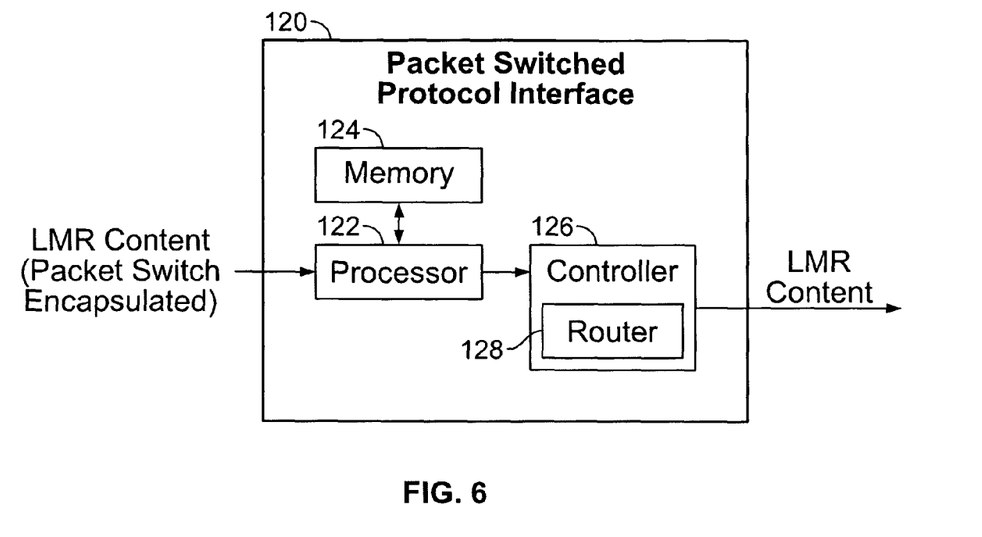
FIG. 6 is a block diagram of a packet switched protocol interface constructed in accordance with an exemplary embodiment of the present invention.
Figure 7:
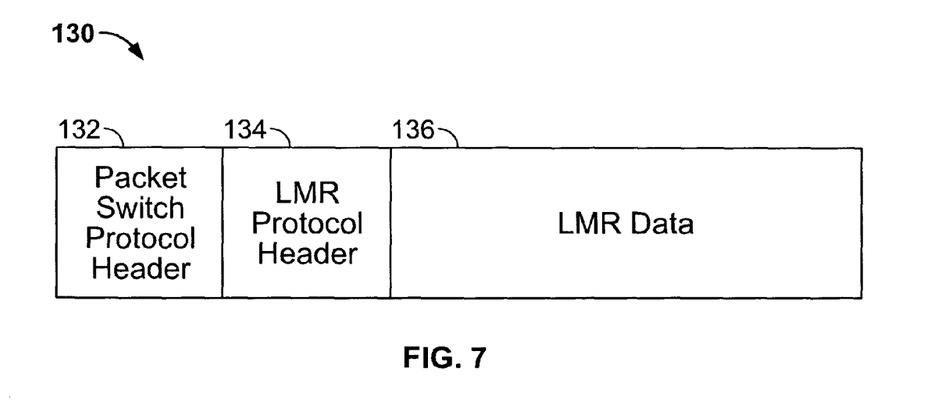
FIG. 7 is a block diagram showing formatted LMR content in accordance with an exemplary embodiment of the present invention.
Figure 8:
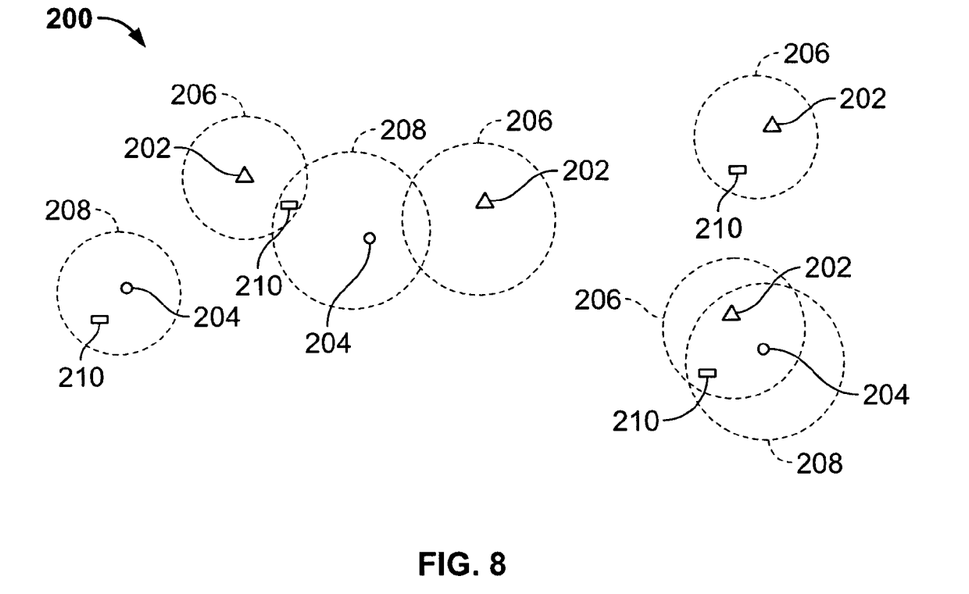
FIG. 8 is a block diagram of an LMR communication system constructed in accordance with an exemplary embodiment of the present invention showing communication coverage areas.

In an alternative embodiment, as shown in FIG. 6, a packet switched protocol interface 120 may be provided in connection with the cellular data network 26 (shown in FIG. 2). The packet switched protocol interface 120 may be provided, for example, as a separate unit (e.g., stand alone module), a card for connection to a server within the cellular data network or software for downloading to a server within the cellular data network. The packet switched protocol interface 120 includes a processor 122 for processing received packet switched encapsulated LMR content for communication to, for example, the packet switched LMR infrastructure 41 (shown in FIG. 2). In particular, and as described in more detail in connection with FIGS. 4 and 5, the processor may receive LMR content formatted as shown in FIG. 7. The LMR content generally includes an LMR data portion and a packet switching protocol encapsulation portion. Specifically, the LMR content 130 may include a packet switch protocol header 132, an LMR protocol header 134 and LMR data 136, for example, an LMR data payload.

This LMR content 130 is essentially encapsulated, for example, encapsulated in an IP wrapper. The processor 122 decapsulates the LMR content 130, for example, by removing the packet switch protocol header 132 and may store the decapsulated LMR content 130 in a memory 124. The LMR content 130 then may be further processed by the processor 122 to determine an action to be performed or an address within the packet switched LMR infrastructure to which the LMR content 130 is to be communicated. Essentially, once the LMR content 130 is decapsulated, the LMR content 130 is configured for communication within a packet switched LMR infrastructure or an LMR network. The control of communication of the LMR content 130 is controlled by a controller 126 that may include a router 128 for routing the LMR content 130 to a destination within, for example, the LMR network. It should be noted that the LMR content may be reencapsulated for transmission within the LMR network or within the cellular data network.

Referring now to FIG. 5 and a method 150 for processing the LMR content, at 152 a determination is made as to whether the LMR content is to be communicated using an LMR network. If a determination is made at 152 that the LMR content is to be communicated using an LMR network then at 154 the LMR content is communicated to the LMR network. This may include communicating the LMR content to a base station of the LMR network based on an LMR protocol header provided in combination with the LMR content. Thereafter, the LMR content is encapsulated at 156, for example, encapsulated in a wrapper defined by the airlink protocol as described herein and routed accordingly at 158. For example, the encapsulated LMR content, which may be configured as a datagram, may be routed within the packet switched LMR infrastructure.

At the destination of the LMR content, the LMR content is processed at 160, for example, decapsulated and then an action determined at 162 based on the processed data. For example, a determination may be made at 162 that an emergency signal is to be transmitted or that the LMR content is to be further routed to another base station. The corresponding action is then performed at 164, for example, within the packet switched LMR infrastructure.

If a determination is made at 152 that the LMR content is not going to be communicated using the LMR network, then the LMR content is encapsulated for communication at 166. For example, in an exemplary embodiment, the LMR encapsulation module 36 (shown in FIG. 2) implements the LMR encapsulation layer 70 (shown in FIG. 3) to encapsulate the LMR content in a wrapper, for example, an IP wrapper. The encapsulated LMR content is then communicated using a cellular data network at 168. This may include routing the encapsulated LMR content in the cellular data network at 170. The LMR content is then communicated to the packet switched infrastructure at 172, for example, based on the IP address from the IP wrapper.

The LMR content is then processed at a destination, which may include decapsulating the LMR content and determining an action at 162. For example, a determination may be made that an emergency signal is to be transmitted or that the LMR content is to be further routed to another base station. The corresponding action is then performed at 164, for example, within the packet switched LMR infrastructure.

Figure 9:
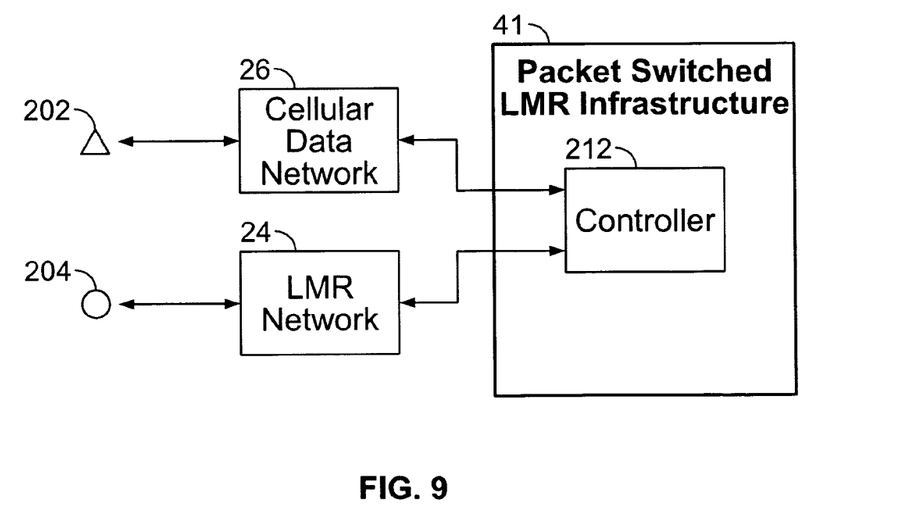
FIG. 9 is block diagram of an LMR communication system constructed in accordance with an exemplary embodiment of the present invention showing data flow.

Thus, various embodiments of the present invention provide for communicating LMR content using an LMR network or a non-LMR network, for example, a cellular data network. If the LMR content is to be communicated using the cellular data network, the LMR content is encapsulated into a packet switching protocol before transmission. For example, and as shown in FIG. 9, an LMR communication system 200 generally includes a plurality of cellular data network base stations 202 and a plurality of LMR network base stations 204. Each of the plurality of cellular data network base stations 202 and plurality of LMR network base stations 204 have a corresponding cellular data network communication coverage area 206 and an LMR network communication coverage area 208, respectively. The cellular data network communication coverage area 206 and LMR network communication coverage area 208 may be overlapping at some locations. The various embodiments of the invention as described herein allow an LMR unit 210, for example, an LMR radio in a mobile unit or vehicle, to communicate via either a cellular data network or an LMR network depending on, for example, the location of the LMR unit 210 and the corresponding available coverage area. More particularly, communication towers (not shown) corresponding to each of the plurality of cellular data network base stations 202 and each of the plurality of LMR network base stations 204 allow wireless communication as described herein.

Further, as shown in FIG. 9, a controller 212 within the packet switched infrastructure 41 may be configured to control communications from the plurality of cellular data network base stations 202 and plurality of LMR network base stations 204 as described herein. The controller may process a plurality of data packets received from either the LMR network 24 and/or cellular data network 26 to determine an appropriate action or routing procedure for the particular data packets as described herein.

The various embodiments or components, for example, the LMR communication system 20 or controllers therein, may be implemented as part of one or more computer systems, which may be separate from or integrated with the LMR communication system 20. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It also should be noted that the various embodiments of the present invention also may provide different and/or additional functionality. For example, end-to-end encryption may be performed, thereby eliminating the use of intervening encryption equipment and the security risk encountered by having such intervening equipment with access to encryption keys. Further, various embodiments of the present invention may provide end-to-end digital voice coding, thereby eliminating the use of intervening transcoding equipment and hence the fidelity loss encountered when one digital voice format is converted to another format.

Additionally, the various embodiments of the present invention may provide mission critical functions such as, for example, PTT, scanning, priority calls with preemption, emergency alerting and notification, content scanning and tracking, navigation, dispatch and GPS location. The mission critical functions may be implemented in different mission critical applications, including, but not limited to, public safety, utility industry and public transit industry.

While the invention has been described in terms of various specific embodiments, those skilled in the art will recognize that the invention can be practiced with modification within the spirit and scope of the claims.

What is claimed is:

1. A method for communicating land mobile radio (LMR) content, comprising:
    selecting, with an LMR unit, a preferred network from among a plurality of networks to be used for communicating LMR content, said plurality of networks including an LMR network and a cellular data network;
    selectively providing an LMR protocol header to the LMR content and using an LMR transmitter to communicate said LMR content to said LMR network if said LMR content is to be communicated using the LMR network;
    selectively IP encapsulating said LMR content at said LMR unit using a packet switch protocol header, and using a cellular radio modem to communicate the encapsulated LMR content to a cellular data network if said LMR content is to be communicated using the cellular data network;
    receiving said IP encapsulated LMR content at said cellular data network;
    decapsulating said LMR content in said cellular data network, by removing the packet switch protocol header;
    processing said LMR content in at least one processor in said cellular data network to selectively determine at least one action which is to be performed, wherein said at least one action includes determining if said LMR content is to be routed to said LMR network or said cellular data network;
    reencapsulating said LMR content for transmission within one of the LMR network and the cellular data network; and
    selectively routing said LMR content to a destination within one of said LMR network or said cellular data network based on said processing step.

2. The method according to claim 1, wherein said destination is a base station within said LMR network.

3. The method according to claim 1, wherein said at least one action comprises issuing one of an emergency signal and a Push-To-Talk ("PTT") request to a talk group.

4. The method according to claim 1, further comprising selectively configuring said LMR content in an LMR standard if said LMR content is to be communicated using the LMR network.

5. The method according to claim 4, wherein said LMR standard is selected from the group consisting of Project 25, Terrestrial Trunked Radio (TETRA), OpenSky, NetworkFirst and Enhanced Digital Access Communication System (EDACS).

6. The method according to claim 1, further comprising selectively configuring said LMR content in a wireless cellular data network standard if said LMR content is to be communicated using the LMR network.

7. The method according to claim 6, wherein said wireless cellular data network standard is selected from the group consisting of General Packet Radio Service (GPRS), Enhanced Data Rates for GSM Evolution (EDGE), Evolution Data Optimized (EV-DO), Universal Mobile Telephone Service (UMTS), and Institute of Electrical and Electronics Engineers (IEEE) 802.11.

8. A system, comprising:
a Land Mobile Radio (LMR) unit comprising an LMR transmitter and a cellular radio modem, said LMR unit configured to:
select a preferred network from among a plurality of networks to be used for communicating LMR content, said plurality of networks including an LMR network and a cellular data network;
selectively provide an LMR protocol header to the LMR content and use said LMR transmitter to communicate said LMR content to said LMR network if said LMR content is to be communicated using the LMR network;
selectively IP encapsulate said LMR content using a packet switch protocol header, and use said cellular radio modem to communicate the encapsulated LMR content to said cellular data network if said LMR content is to be communicated using said cellular data network; and
a cellular base station in said cellular data network, said cellular base station comprising at least one processor configured to:
receive said IP encapsulated LMR content;
decapsulate said LMR content by removing the packet switch protocol header;
process said LMR content to selectively determine at least one action to be performed, wherein said at least one action includes determining if said LMR content is to be routed to said LMR network or said cellular data network;
reencapsulate said LMR content for transmission within one of the LMR network and the cellular data network; and
selectively route said LMR content to a destination within one of said LMR network or said cellular data network based on said processing step.

9. The system according to claim 8, wherein said destination is a base station within said LMR network.

10. The system according to claim 8, wherein said at least one action comprises issuing one of an emergency signal and a Push-To-Talk ("PTT") request to a talk group.

11. The system according to claim 8, wherein said at least one processor is further configured to selectively configure said LMR content in an LMR standard if said LMR content is to be communicated using the LMR network.

12. The system according to claim 11, wherein said LMR standard is selected from the group consisting of Project 25, ETSI TETRA, OpenSky, NetworkFirst and EDACS.

13. The system according to claim 8, wherein said at least one processor is further configured to selectively configure said LMR content in a wireless cellular data network standard if said LMR content is to be communicated using the LMR network.

14. The system according to claim 13, wherein said wireless cellular data network standard is selected from the group consisting of General Packet Radio Service (GPRS), Enhanced Data Rates for GSM Evolution (EDGE), Evolution Data Optimized (EV-DO), Universal Mobile Telephone Service (UMTS), and Institute of Electrical and Electronics Engineers (IEEE) 802.11.

* * * * *